Figure 1:
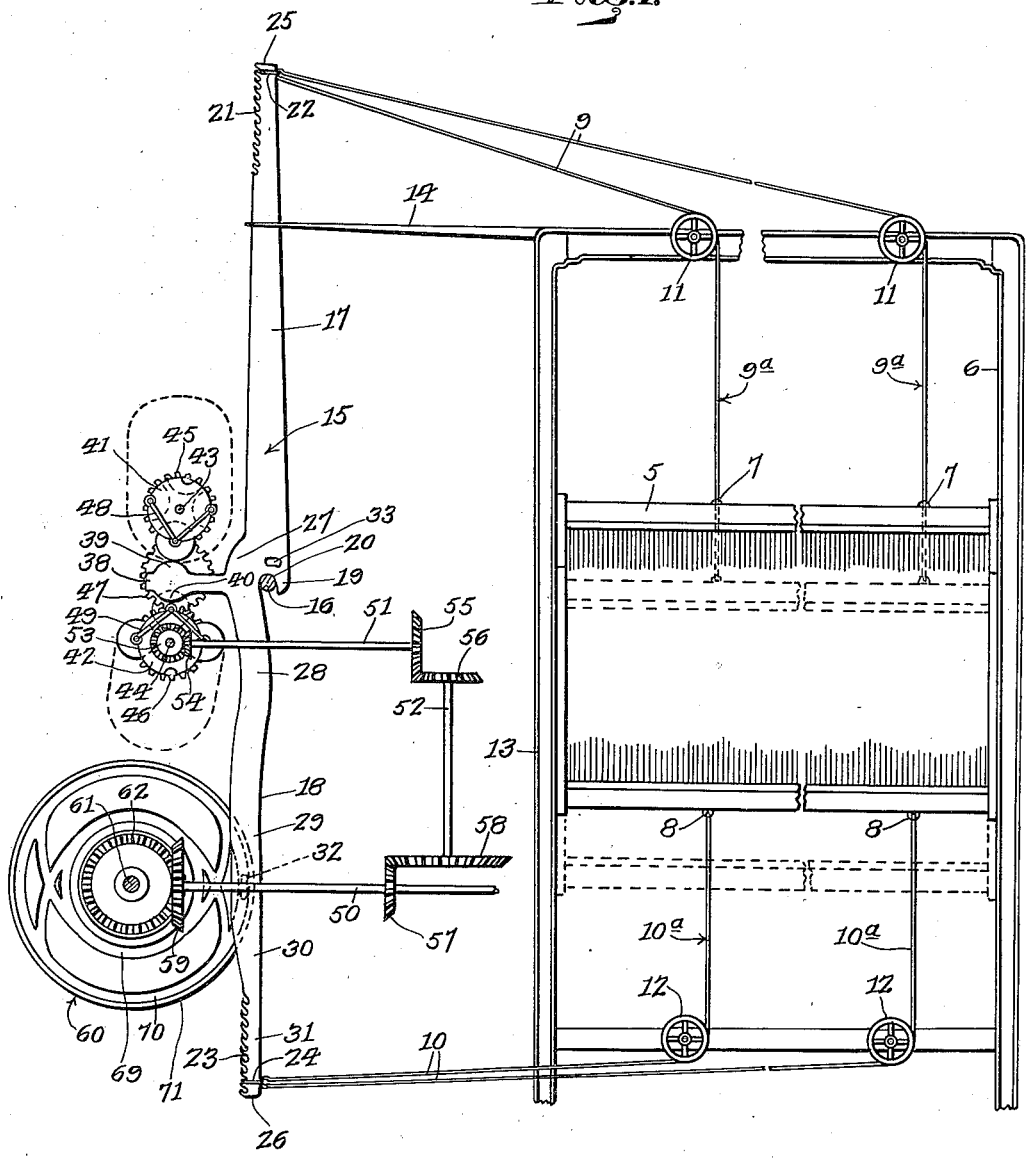

May 4, 1937.  A. W. GIONET  2,079,502
ACTUATING MEANS FOR HARNESS MOTION OF LOOMS
Filed Aug. 1, 1935   3 Sheets-Sheet 1

Inventor
Arthur W. Gionet

By Geo. P. Kimmel
Attorney

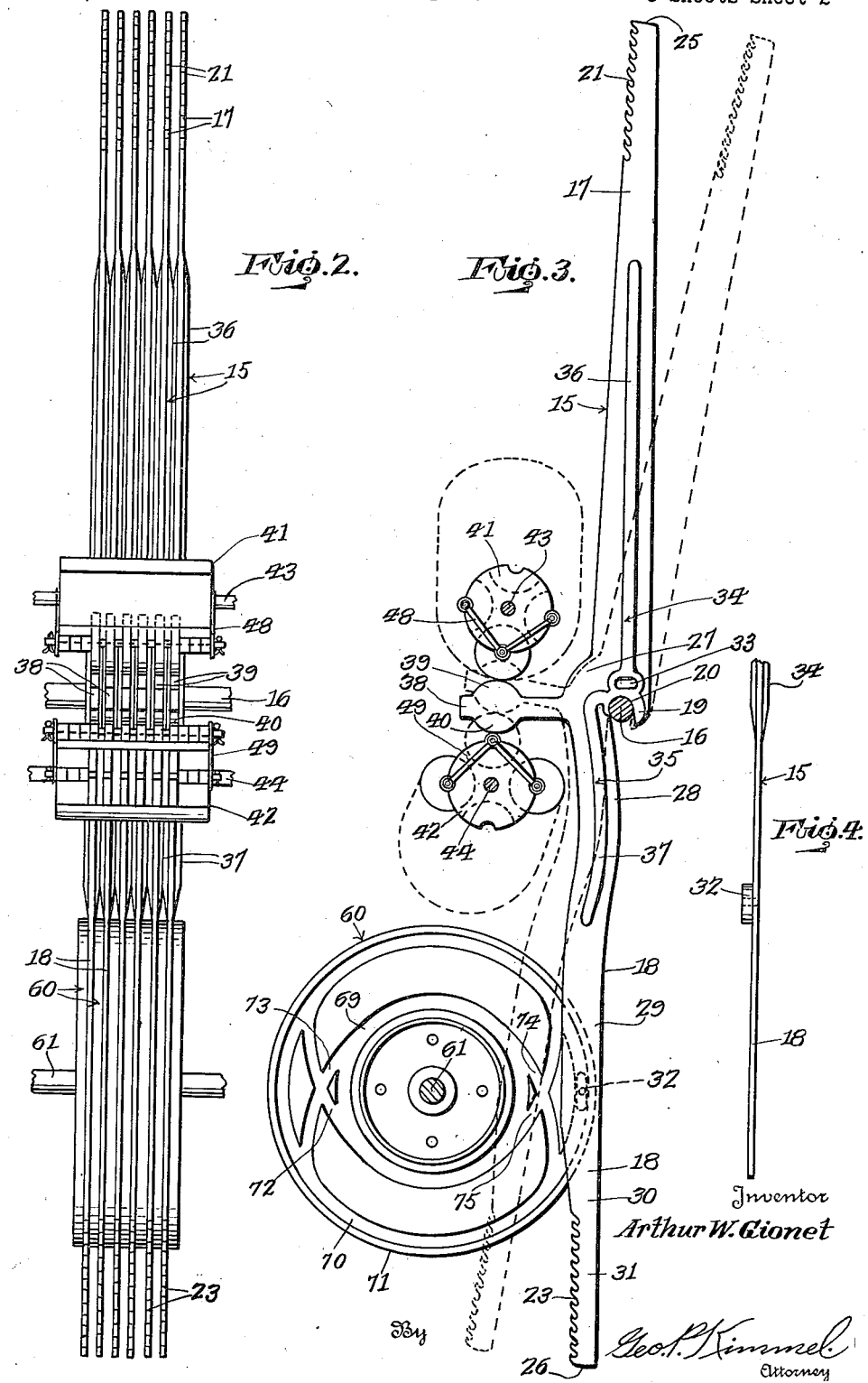

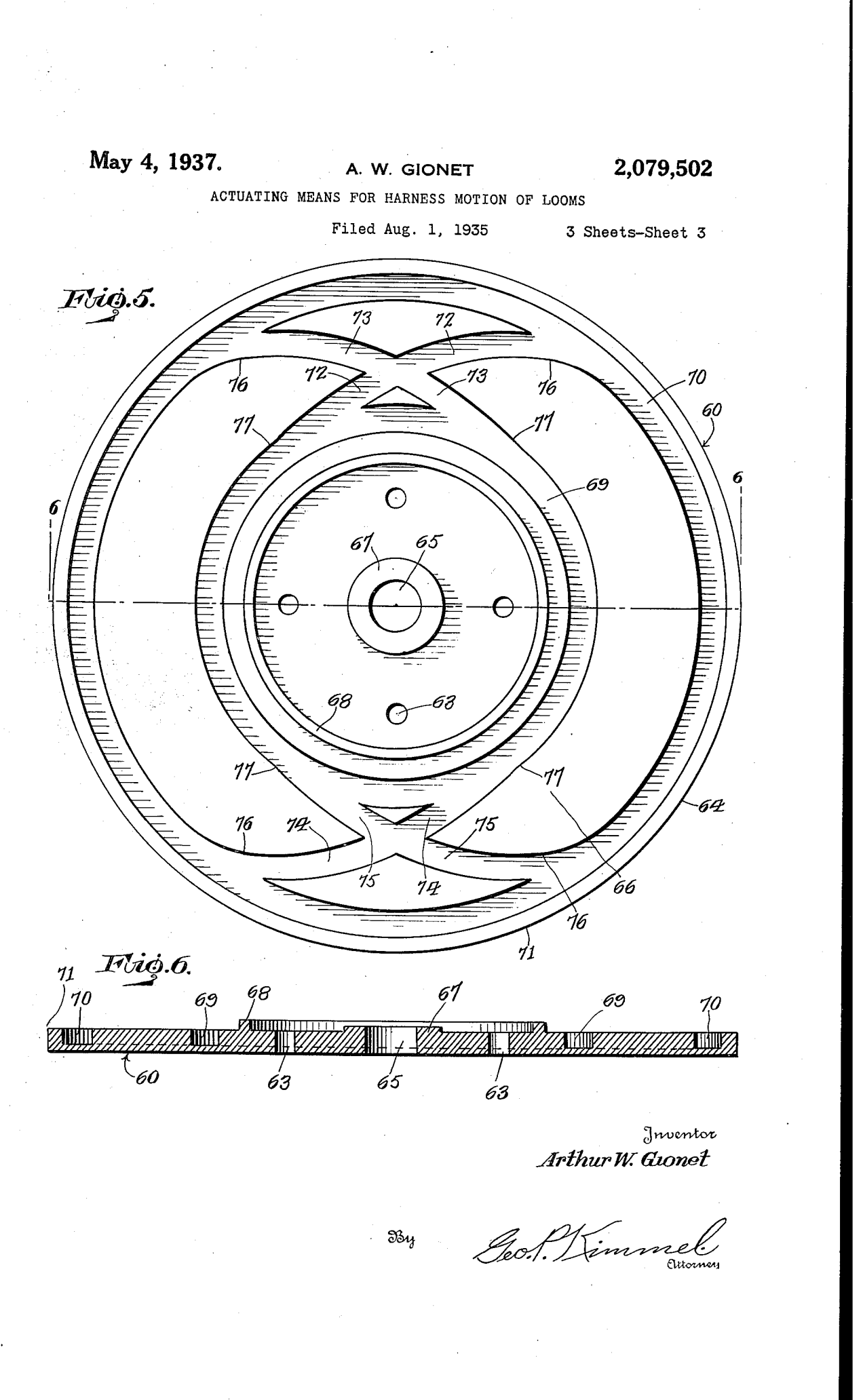

May 4, 1937.  A. W. GIONET  2,079,502
ACTUATING MEANS FOR HARNESS MOTION OF LOOMS
Filed Aug. 1, 1935  3 Sheets-Sheet 3

Fig.5.

Fig.6.

Inventor
Arthur W. Gionet

By Geo. S. Kimmel
Attorney

Patented May 4, 1937

2,079,502

UNITED STATES PATENT OFFICE 2,079,502

ACTUATING MEANS FOR HARNESS MOTION OF LOOMS

Arthur W. Gionet, Lowell, Mass., assignor to Boott Mills, Lowell, Mass.

Application August 1, 1935, Serial No. 34,278

5 Claims. (Cl. 139—76)

This invention relates to an actuating means for the harness motion of looms.

It is well known that it is a prime requisite to obtain highest degree of quality in the fabric being woven that the harness actuating movement in both directions be absolutely positive. This action, as is also well known, is not obtainable with any of the present mechanisms now used actuated by springs, although considerable speed is obtainable on such mechanism at the expense of its positiveness. Further, it is also well known that there are other mechanisms, not spring actuated, also employed which are positive, but their inherent design limits the practical speed at which they may be operated.

It is the primary object of this invention to provide in a manner as hereinafter set forth, an actuating means for the harness motion of looms which is absolutely positive in action, permits of great ease of pattern change and obtains a positive mechanical control for the complete cycle of operation of the harness motion. Higher operating speed than that heretofore obtained, while important, is secondary to the above.

With the foregoing and other objects which may hereinafter appear, the invention consists of the new, novel and practical construction of actuating means or control for the purpose referred to as will be more specifically referred to and as illustrated in the accompanying drawings wherein is shown an embodiment of the invention, but it is to be understood that changes, variations and modifications may be resorted to which fall within the scope of the invention as claimed.

In the drawings:

Figure 1 is a diagrammatical view, in front elevation, showing the relation of the actuating means, in accordance with this invention, with respect to the jack or harness levers of a loom and the relation of the top and bottom pattern cylinders with respect to the jack or harness levers and the said actuating means, Figure 2 is a side elevation illustrating jack or harness levers, top and bottom pattern cylinders, risers and sinkers and actuating means, in accordance with this invention, associated with the said levers, Figure 3 is a front elevation of the structure shown in Figure 2, Figure 4 is an edge view of the lower portion of a jack or harness lever, Figure 5 is an elevation of the cam of the actuating means, and Figure 6 is a section on line 6—6, Figure 5.

With reference to Figure 1, individual harnesses or heddles are designated 5 and a loom supporting frame at 6. Each harness has its top and bottom formed with oppositely disposed pairs of spaced eyes as at 7, 8, respectively. Attached to the eyes 7 are the free ends of the stretches 9 of a strap 9ª, and attached to the eyes 8 are the free ends of the stretches 10 of a strap 10ª. The frame 6 at its top supports a pair of spaced guide pulleys 11 for the stretches 9 of the strap 9ª. Suitably supported in the lower portion of frame 6 is a pair of spaced guide pulleys 12 for the stretches 10 of the strap 10ª. The stretches of the straps pass around the pulleys and extend outwardly with respect to the side 13 of frame 6. Projecting outwardly from the upper end of the side 13 of frame 6 is a comb 14 which constitutes a guide for the upstanding oscillatory jack or harness levers 15 to be hereinafter more specifically referred to. A suitably supported fulcrum or pivot bar 16 common to the levers 15 is arranged outwardly adjacent to and below the top of the side 13 of loom frame 6.

Each lever 15 includes an upper arm 17 and a lower arm 18 which merges at the upper terminal portion of its inner side edge with the lower terminal portion of the outer side edge of the arm 17, whereby the upper portion of arm 18 is offset with respect to the lower portion of arm 17. The lower end of arm 17 is formed with a depending tongue 19 which opposes and is spaced from the inner edge of arm 18. The arms 17, 18 and tongue 19 coact to provide the lever 15 with a downwardly opening groove 20 for the purpose of mounting the lever 15 at its center upon the bar 16. The lower end of arm 17 is positioned below the upper end of arm 18. The upper terminal portion of the outer side edge of arm 17 is formed with a series of transversely extending superposed downwardly inclined notches 21, each for selectively receiving a coupling member 22 for a strap 9ª whereby the latter is connected to the arm 17 to be shifted on the rocking movement of the lever. The member 22, when connecting strap 9ª to the lever, preferably extends through the bend in the straps or may be anchored to the strap in any suitable manner. The lower terminal portion of the outer side edge of arm 18 is formed with a series of transversely extending superposed downwardly inclined notches 23 for selectively receiving a coupling member 24 for a strap 10ª whereby the latter is connected to the arm 18 to be shifted on the rocking movement of the lever. The member 24, when connecting strap 10ª to the lever, preferably extends through the bend in strap 10ª or it may be anchored to strap 10a in any suitable manner. The straps 9a, 10a travel in alternate directions when shifted by lever 15. The notches 21 permit of adjusting the member 22 at varying distances from the upper terminus 25 of arm 17. The notches 23 permit of adjusting the member 24 at varying distances relative to the lower terminus 26 of arm 18.

The arm 18 includes an upper portion 27 which is offset laterally with respect to the lower portion of arm 18, a curved portion 28 depending from and of greater length than portion 27, a straight portion 29 depending from portion 28, a tapered portion 30 depending from portion 29 and a reduced lower end terminal portion 31. The arm 18 has on the inner face of the portion 29 thereof a laterally extending pivoted lug 32 having rounded ends. The lug extends lengthwise of and is arranged on the longitudinal median of the said portion 29 in proximity to the portion 30. The lug 32 is to be of such size and shape as to follow cam grooves without interference at the junctions of the tangentially disposed grooves. Lug or cam follower 32 is pivoted so that it may follow cam races or grooves freely.

The lever 15 intermediate its ends and in proximity to tongue 19 is formed with a transverse slot 33. The front and rear faces of lever 15 are provided with narrow reinforcing webs 34, 35 of like form and which register with the walls of tongue 19 and slot 33. Each web includes an inclined part 36 extending lengthwise of and of less length than that of arm 17 and a curved part 37 extending lengthwise of and of less length than that of arm 18. The parts 36, 37 terminate adjacent the outer ends of arms 17, 18, respectively, and are of different lengths.

The lever 15 includes a rocking arm 38 therefor which is integral with and extends outwardly at right angles to the portion 27 of arm 18. The arm 38 is of less length than arms 17, 18 and in proximity to its outer end is formed with a pair of oppositely disposed rounded edge enlargements 39, 40 extending laterally from its side edges.

The top and bottom pattern cylinders of the loom are designated 41, 42, respectively, their shafts at 43, 44, respectively, and their driving gears 45, 46, respectively, carried by the shafts 43, 44, respectively, supported in any suitable manner. The gears 45, 46 have interposed therebetween and mesh with an idler gear 47 which is supported in any suitable manner. A pattern chain 48, of any desired length, of risers and sinkers is associated with cylinder 41. A pattern chain 49, of any desired length of risers and sinkers is associated with the cylinder 42. The lever 38 is interposed between the cylinder 41, 42 to be simultaneously engaged by a riser and a sinker on opposite chains. The risers and sinkers are arranged in a manner to provide a clearance for a riser when the latter is active and a clearance for a sinker when the latter is active. The risers and sinkers act on the enlarged portions 39, 40 to rock arm 38. The risers on upper chain function to move arm 17 outwardly and arm 18 inwardly. The risers on lower chain function to move arm 17 inwardly and arm 18 outwardly whereby a harness or heddle will be shifted upwardly and downwardly as needed. Risers and sinkers on pattern chains are so placed that one of each on each chain controls the position of arm 38. If it is desired to have a lever 15 in position indicated by solid lines in Figure 3, the upper cylinder has a riser and the bottom cylinder a sinker in contact with rounded edge enlargements 39 and 40 respectively. If it is desired to have lever 15 in position indicated by dotted lines on Figure 3, the upper chain would have a sinker and the bottom chain a riser. To obtain any desired location of any number of harnesses or heddles at any given time, the pattern cylinders would have the corresponding risers and sinkers on the pattern chains. For every riser on one chain a corresponding sinker would be on the opposite pattern chain. By this means arm 38 is always positively controlled and through this the location of lug 32 is controlled in cam grooves as required by pattern to be woven.

The cam shaft of the loom is indicated at 50 and leading therefrom to the shaft 44 of the bottom pattern cylinder is a power transmitting means consisting of suitably supported shafts 51, 52, bevel pinions 53, 54, 55, 56 and 57, and a bevel gear 58. The pinion 53 is carried by shaft 44 and meshes with pinion 54 which is carried by one end of shaft 51. The pinion 55 is carried at the other end of shaft 51 and meshes with pinion 56 at one end of shaft 52. The gear 58 is carried by the other end of shaft 52 and meshes with pinion 57 carried by cam shaft 50. The latter at its outer end has a bevel gear 59 for a purpose to be referred to.

The actuating means, in accordance with this invention, includes a series of cams 60, one for each harness, which revolve upon a fixed center 61 supported by any desirable means. Fixed to the cams 60 is a bevel gear 62 which meshes with and is driven from the gear 59 on the cam shaft. Openings 63 are formed in cams 60 for the passage of holdfast means, not shown, to anchor gear 62 to the cams.

The cam 60 comprises a circular disc-like body 64 of any desired thickness formed with an axial opening 65. The face 66 of body 64 is formed with an annular boss 67 which registers with the wall of opening 65 and a circular ridge 68 of greater depth and materially greater diameter than that of boss 67. The ridge 68 is arranged in concentric relation to the boss. The face 66 is formed with an inner and an outer circular groove or race 69, 70, respectively, arranged in concentric spaced relation. The groove 69 is disposed in proximity to the ridge 68. The groove 70 is arranged in close proximity to the outer edge 71 of body 64. The face 66 of body 64 is formed with two oppositely disposed spaced pairs of tangentially disposed grooves or passages. The grooves of each pair are oppositely disposed and intersect each other at the diametric center of body 64. If it is so desired, the cam may be so designed that it has more than two pairs of tangentially disposed grooves or passages. The grooves of one pair are designated 72, 73 and those of the other pair at 74, 75. The grooves of each pair intersect the outer wall of and open at their inner ends in the inner groove 69 at four spaced points of the latter. The grooves of the said pairs establish communication between the inner and outer grooves 69, 70, respectively, at four points of the inner groove 69 and at four points of the outer groove. Each of the grooves of each of the pairs of grooves is of like form. The inner wall of each of the grooves 72, 73, 74 and 75 at its outer end is flared, as at 76. The outer walls of the grooves 72, 73, 74 and 75 are of greater length than the inner walls thereof and form a slight point 77 at their points of mergence with the outer wall of the inner groove 69.

Pressure on arm 38 will be exerted by risers in pattern chains 48 and 49 at the time cams 60 in their revolutions will bring the tangentially disposed grooves 72, 73, 74 or 75 to the point where lug or follower on lever 15 is located and thereby cause said follower to follow groove desired, and thereby cause lever 15 and harness 5 to be in position desired.

The lug 32 is termed a follower and which is to follow the grooves 69, 70, 72, 73, 74 and 75. The lug 32 is movable through a tangential groove from within groove 69 to outer groove 70 and vice versa as needed. The inner groove 69, in connection with lug 32, will control one of the stationary positions of the harness or heddle frame and the outer groove 70 will control the other stationary position of the harness or heddle frame.

By means of the pattern chains having risers and sinkers, the lug or follower 32 will be shifted to follow the inner or outer groove and through the lever attached to the harness or heddle frame cause this latter to be arranged in its desired position by a positive movement.

The lug or follower 32 on the lever 15 operates in the inner and outer circular races or grooves of the cam 60. The pattern chain mechanism coacting with the arm 38 of the lever 15 will cause the lug or follower 32 to follow the desired race or groove of the cam 60, or cause a change from one race or groove to the other as required by the pattern. The position of the lever 15 determines the position of the harness or heddle frame in the loom.

The advantages possessed by the invention as disclosed by the application over other methods of harness operation are as follows: It will be positive in its movement; it will permit great flexibility of design and may be easily, quickly and inexpensively changed from one design to another; it is simple and economical; the rotatable element or cam is of universal nature and may be used for any pattern needed, as formerly it was necessary to change cams for every different pattern wanted; that changes in design are quickly and easily made by changing positions of risers and sinkers on pattern chains; that it will permit of higher operating speeds than was obtainable or practicable formerly with the use of dobbies, head motions, side cams or underneath cams for more than the simplest weaves; that it may be mounted at side, above or underneath the harness or heddle frame as would be best adapted to the loom to which it is to be applied; and that it is a prime requisite to obtain highest degree of quality in the fabric being woven due to the fact that the actuating movement in both directions is absolutely positive.

The cams and necessarily the cam tracks are synchronized with the action of the risers and sinkers by means of gears or other suitable means. Both cam and pattern chains are to be driven from the same cam shaft, and gears or other suitable means will be so disposed to bring the risers on pattern chains in contact with the extended levers on the harness jacks at the time in the revolution of the cams that one end of a tangentially disposed groove of the cams will be in contact with the followers on the harness levers.

The function of the cam track follower is to hold the heddle frame in the desired position at all times. The cam follower is at all times in a raceway in the cam.

By having the cam follower in a groove or raceway at all times, the "positive action" is obtained. It is to be understood that other means of controlling the cam follower may be used if desired.

There are now looms and harness motions that give "positive action," but they do not have the ease or flexibility of pattern change, or they do not have the speed possible in accordance with this invention.

There are now looms and harness motions that have speed and ease or flexibility of pattern change, but they do not have the positive action.

A positive mechanical control may be termed a dual one as the rock arm of the harness lever coacts with the pattern chains to set up a positive control for a portion of the cycle of operation of the harness motion and the pivoted lug on the harness lever coacts with the cam to provide a positive control for the remaining portion of the cycle of operation of the harness motion.

What I claim is:

1. A dual control for a harness lever of a loom for positively controlling the lever during its complete cycle of operation, said control comprising in combination a laterally offset arm for contacting with a pair of pattern chains and a pivoted element, said arm and element being carried by said lever, and a cam track embodying inner and outer communicating raceways coacting with said element to positively control said lever for a portion of the cycle of its operation, said cam being disposed below said contact arm, said contact arm being alternately contacted on opposite surfaces thereof simultaneously by a riser of one and a sinker of the other chain to positively control said lever during that portion of the cycle of its operation which the lever is not positively controlled by the raceways coacting with said element.

2. In a positive mechanical control for the complete cycle of operation of the harness lever of a loom, said control comprising in combination an upper pattern chain of risers and sinkers, a lower pattern chain of risers and sinkers, a harness lever provided intermediate its ends with a rock arm therefor extending laterally therefrom in the path of said chains for simultaneous engagement by a riser of one and a sinker of the other and for alternate simultaneous engagement by a sinker of one and a riser of the other chain whereby said arm will be rocked and provide in connection with the risers and sinkers of said chains a positive control for a portion of the cycle of the operation of said lever, a cam having inner and outer communicating raceways synchronizing with the risers and sinkers of said chains, said lever being provided below said arm with a pivoted lug for alternately travelling in said raceways and coacting with the cam to provide a positive control for the remaining portion of the cycle of operation of said lever.

3. The invention as set forth in claim 2 having said arm formed with spaced opposed laterally extended surfaces for contact with the risers and sinkers of said chains.

4. The invention as set forth in claim 2 having said lever provided with means aligning with the said arm for the seating of the lever on a fulcrum, and said lug on the lever travelling in said raceways being on one side face of the lever and disposed in offset relation with respect to that means on the lever for seating the latter on the fulcrum.

5. In a positive mechanical control for the complete cycle of operation of the harness lever of a loom comprising in combination a pair of pattern chains, each having risers and sinkers, a cam provided with inner and outer raceways synchronized with said sinkers and risers, a harness lever having an extended inherent part coacting with the risers and sinkers of said chains for positively controlling a portion of the cycle of operation of the lever, and means attached to said lever and coacting with said raceways for positively controlling the remaining portion of the cycle of operation of said lever.

ARTHUR W. GIONET.